United States Patent
Maloney et al.

(10) Patent No.: US 6,873,257 B2
(45) Date of Patent: Mar. 29, 2005

(54) VEHICLE LOCATION DEVICE

(76) Inventors: Craig Maloney, 16712 Algonguin St., Apt. #3, Huntington Beach, CA (US) 92649; Dragoslav Grbovic, 7521 Kingston Pike #110, Knoxville, TN (US) 37919

( * ) Notice: Subject to any disclaimer, the term of this patent is extended or adjusted under 35 U.S.C. 154(b) by 33 days.

(21) Appl. No.: 10/612,119

(22) Filed: Jul. 1, 2003

(65) Prior Publication Data
US 2004/0066293 A1 Apr. 8, 2004

Related U.S. Application Data
(60) Provisional application No. 60/392,656, filed on Jul. 1, 2002.

(51) Int. Cl.$^7$ ................................................ G08B 1/08
(52) U.S. Cl. ............................ 340/539.21; 340/539.23; 342/118; 367/99
(58) Field of Search ................. 340/539.13, 539.15, 340/539.21, 539.23, 539.32, 573.1, 825.49; 342/118, 357.01, 457; 367/99, 107; 455/134; 701/224

(56) References Cited

U.S. PATENT DOCUMENTS 6,127,931 A * 10/2000 Mohr ........................ 340/573.4
6,529,131 B2 * 3/2003 Wentworth ............... 340/573.1
2004/0027244 A9 * 2/2004 Menard .................... 340/573.1

* cited by examiner

*Primary Examiner*—Jeffery Hofsass
*Assistant Examiner*—George A Bugg

(57) ABSTRACT

A position locating device for identifying the distance and direction from a first object located with a user to a second object. The first object transmits a signal to the second object. The second object returns a signal to the first object. Microphones are arranged around the first object such that the time at which a microphone receives the returned signal is related to the direction of the second object relative to the first object. A receiver located at the first object decodes and analyzes the signal and its intensity to determine the distance of the second object.

1 Claim, 15 Drawing Sheets

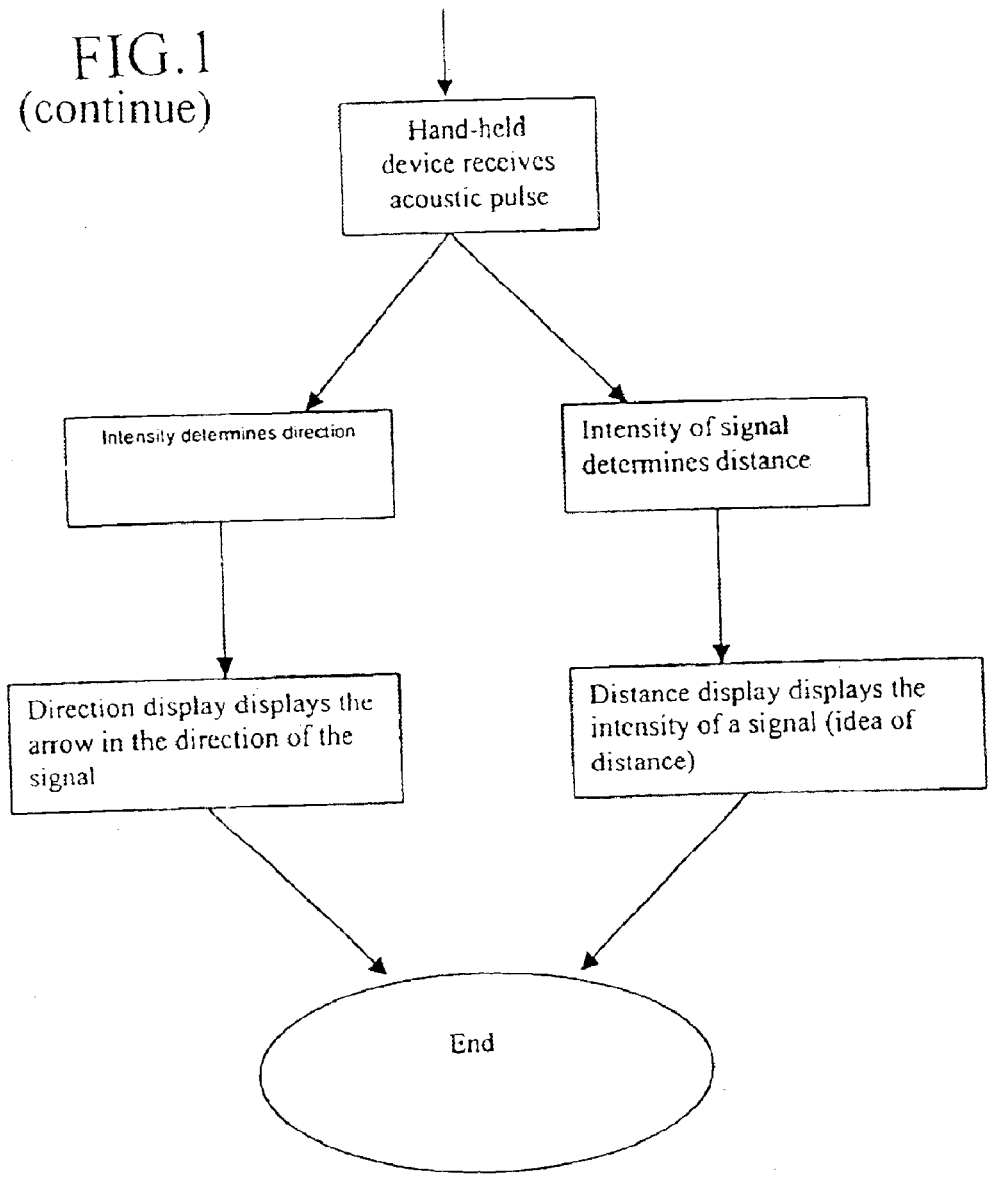

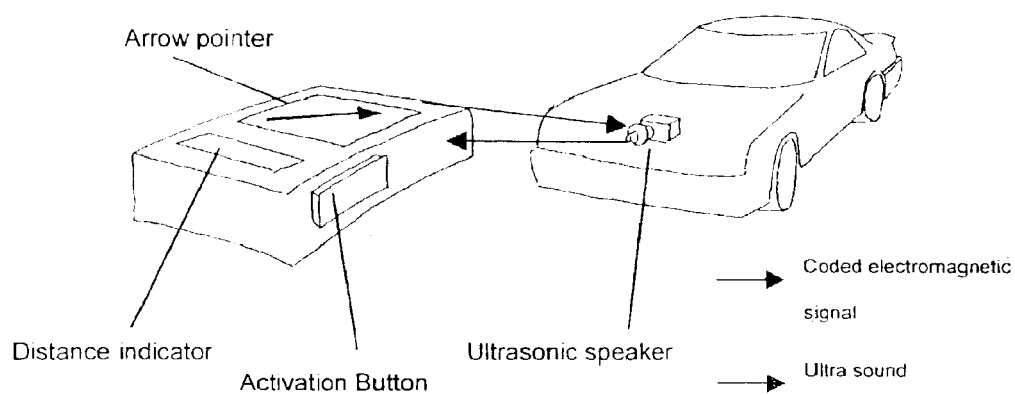
FIG: 2

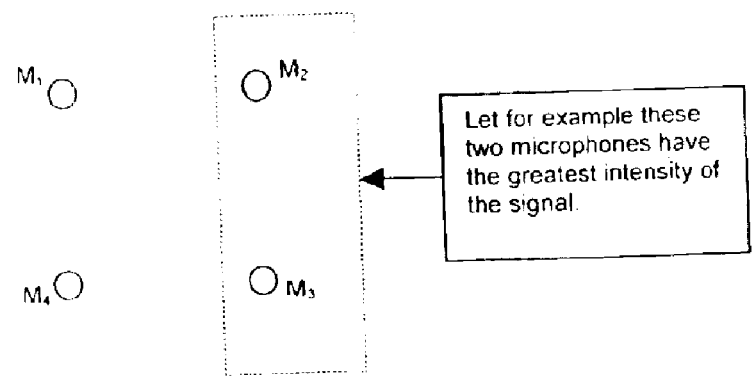
FIG: 3

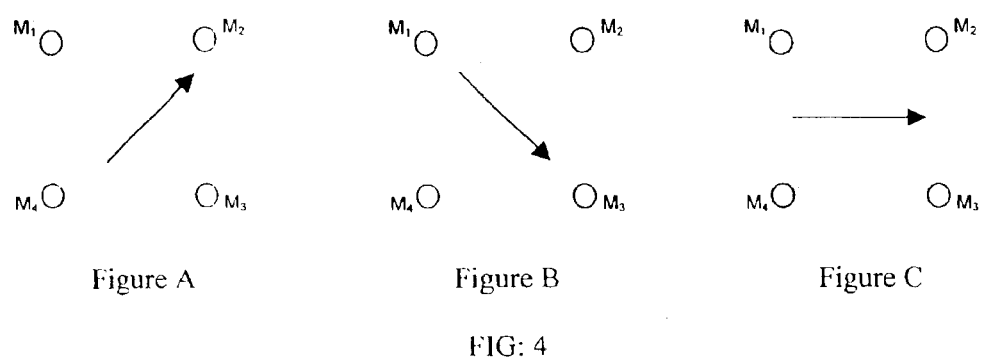
Figure A                    Figure B                    Figure C
FIG: 4

FIG: 5
FIG: 6

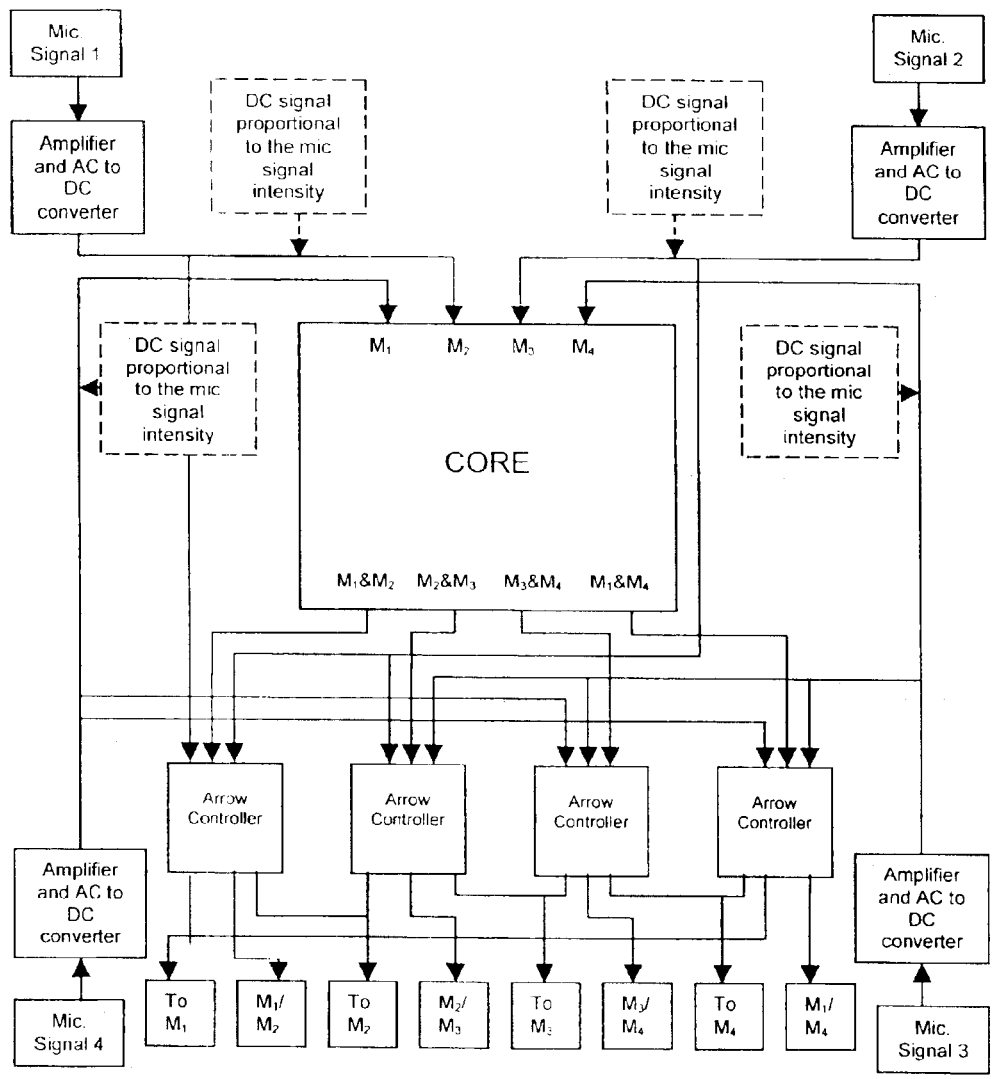
FIG: 7

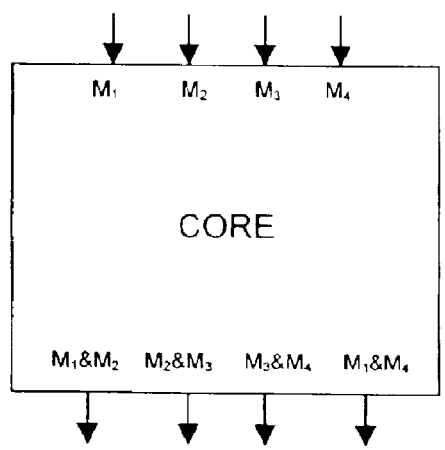
FIG: 8

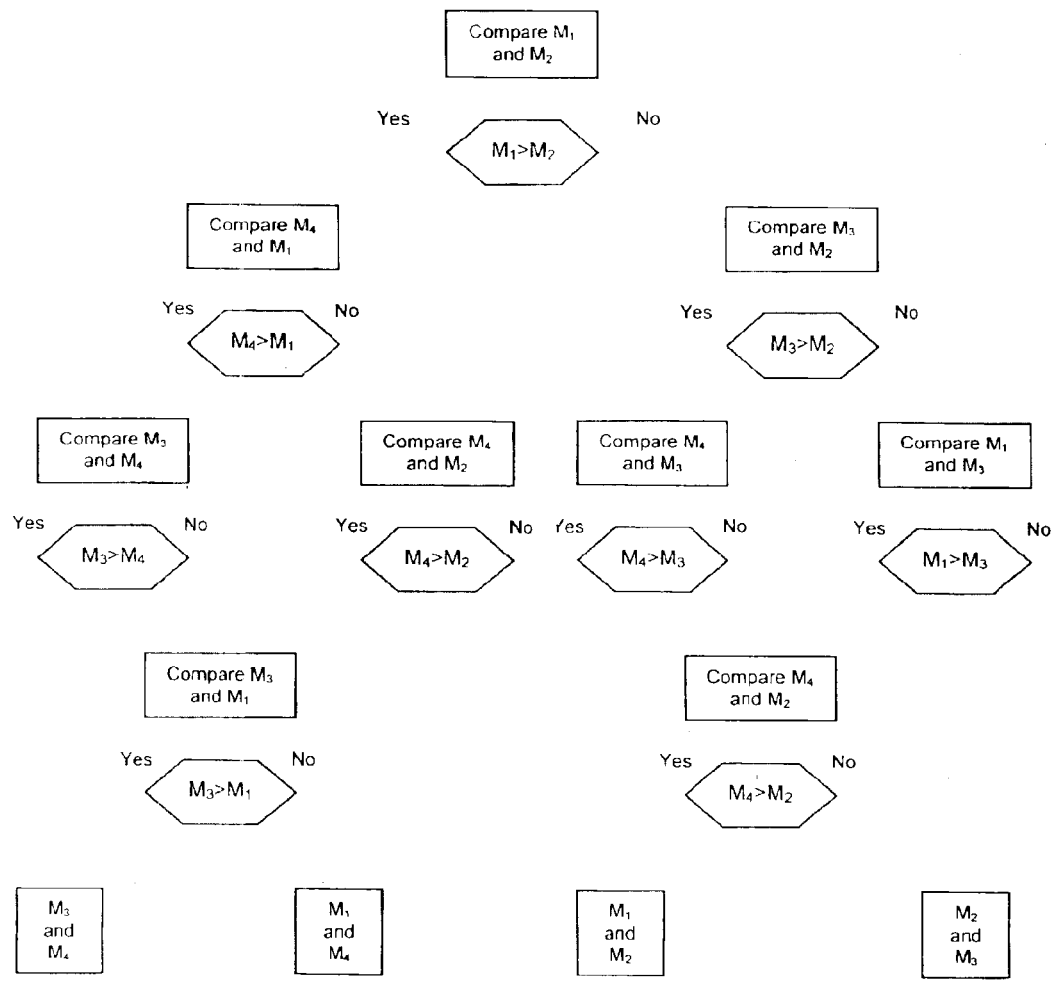
FIG: 9

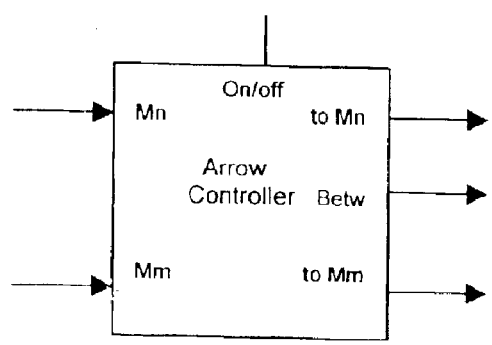
FIG: 10

| Input | to $M_n$ | Between | to $M_m$ |
|---|---|---|---|
| $(M_n - M_m) > V_t$ | 1 | 0 | 0 |
| $\|M_n - M_m\| < V_t$ | 0 | 1 | 0 |
| $\overline{(M_n - M_m)} > V_t$ | 0 | 0 | 1 |

FIG: 11

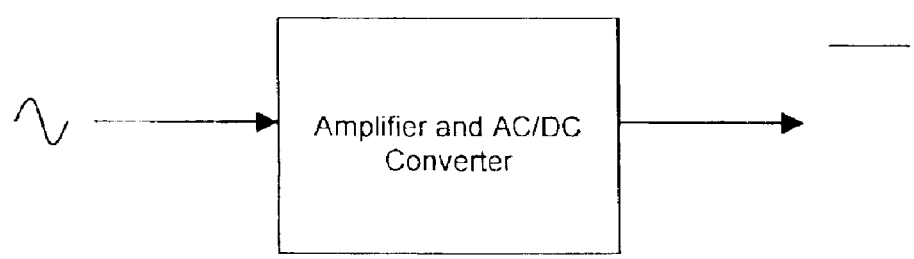
FIG: 12

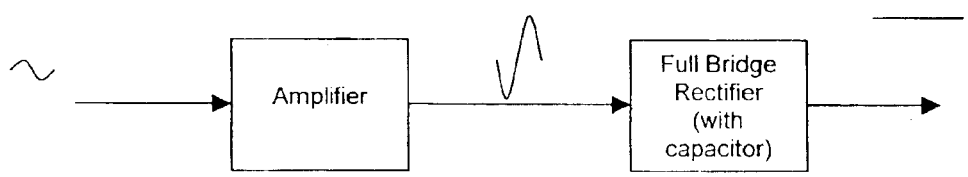
FIG: 13

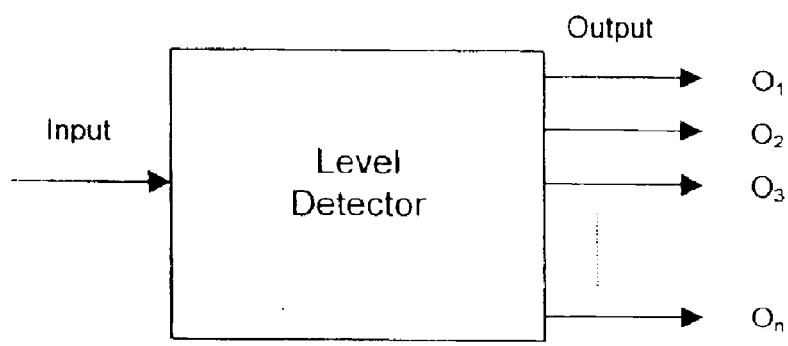
FIG: 14

| Distance from the object | $O_1$ | $O_2$ | | $O_{n-1}$ | $O_n$ |
|---|---|---|---|---|---|
| $(n-1)D/n$ | 1 | 0 | | 0 | 0 |
| $(n-2)D/n$ | 1 | 1 | | 0 | 0 |
| | | | | | |
| $2D/n$ | 1 | 1 | | 0 | 0 |
| $D/n$ | 1 | 1 | | 1 | 0 |
| 0 | 1 | 1 | | 1 | 1 |

FIG. 15

VEHICLE LOCATION DEVICE

This application claims the benefit of Provisional Application 60/392,656 filed Jul. 1, 2002.

BACKGROUND OF THE INVENTION

Often, people forget where they have parked their vehicle. Especially in a large shopping mall parking lot, or at a large sporting arena parking lot, the task of finding your car can become quite difficult to perform. A person cold spend a lot of time trying to find there vehicle, which could become severely annoying if weather conditions are not favorable, and could even become dangerous if the individual is attempting to evade another person chasing them.

Devices do exist to solve the problem of locating the position of a vehicle if the user has forgotten the vehicle's location. Some inventions have used visual displays, like U.S. Pat. No. 6,203,181, to assist the user in finding the position of their vehicle. These methods are disadvantaged when the user located out of the visual range of the vehicle, or if the user's vehicle is parked in between two larger Sports Utility Vehicles and can not be seen easily.

In invention of Global Positioning Systems (GPS) have brought about devices to solve the problem of being able to locate a vehicle. But methods using GPS, such as U.S. Pat. No. 6,363,324, carry the burden of both preprogramming the position of the vehicle before the user leaves the area that the vehicle is located. This requires the vehicle's user to remember to preprogram the GPS every time that the user leaves the car, or requires an additional device to constructed that programs the location of the vehicle for the user. Also, most GPS are large and bulky devices that can be uncomfortable to be carried by the user and demand extraordinary power supplies.

Radio frequency transponders are also used to perform the function of locating a predetermined object, such as U.S. Pat. No. 5,686,887. Again, the main disadvantage to this method is the size of the equipment and power supply needed to carry out the function of locating a remote object with radio frequency. This method of using radio frequency is also disadvantaged because radio waves are supervised by the Federal Communications Commission and require special permits to be used.

A second major disadvantage of many the prior art, is how the devices communicate the location of the object the device is locating to the user. Many devices, such as U.S. Pat. No. 5,710,548, display only the direction the predetermined object is located in from where the user is located. Whereas the invention disclosed within this application provides the user with a display communicating both the direction and distance to where the predetermined object is located from the where the user is located. This enables the user to be led by the device to where the predetermined object is, as opposed to only being pointed in the right direction of the position of the predetermined object.

A third prior art that is very similar to the disclosed invention is U.S. Pat. No. 5,606,325. This invention is a different solution to the same problem that the present invention is solving. It includes a hand-held device that on request sends out a signal that is received by a predetermined stationary device that returns a signal back to the portable device that then displays the direction of the thing the user is searching for to the user. There are two characteristics that separate this invention and the present invention being disclosed. The first is that the previous device displays only a direction display to the user to assist in finding the thing they are searching for, while the present invention provides a gauge to measure range to the object.

Secondly, the way that the previous invention operates is different and more complicated, and therefore more inefficient and costly then the present invention. The previous invention sends a signal from its portable device to the stationary device. Then the stationary device determines the absolute direction from where the signal originated, and then replies to the portable device with a specific predetermined signal indicating the absolute direction towards the stationary device. So, using cardinal directions to describe an example of how the prior invention operates, if the signal from the portable device originated South of the stationary device, then the stationary device will transmit a North signal to the device to display to the user. The same example applies to if the portable signal originates it's signal to the East of the stationary device, then the stationary device will transmit a West signal to the portable device.

The present invention being disclosed improves on this method by simplifying the signal transaction process. Instead of the stationary signal receiving the portable device's signal and determining the direction from where the signal originated, the stationary device simply reply's back to the portable device by emitting a simple and coded reply signal. A plurality of microphones located on the portable device intercept the reply signal and the order the microphones intercept the signal determines the direction of the stationary device. Thus, eliminating two steps in determining the portable signal's direction from where the stationary device is located and the need to transmit a specifically coded signal back to the portable device, which then has to interpret the specific signal and display the signal's matching signal.

Plus, the prior art's method, sends the portable device a signal indicating the absolute direction of the portable device to the stationary object. This method demands that the user using the device must remain in one location while searching for the stationary object in order to receive the most accurate account of the stationary object's location. This disadvantage confine the user, for example, if the user is being chased and needed to locate the safety of their vehicle, or if the portable device's power is out of range from where the vehicle is located. The method of the present invention allows the user to be mobile, because the direction indicators are located with the portable device being carried by the user. So, when the coded signal is intercepted by the portable device, the portable device is able to provide the user with the direction towards the user's vehicle at that moment, rather than the direction of the user's vehicle when the portable device had sent the signal.

In addition to the above improvements, the less steps taken by the present invention over the prior invention allow for lest electrical processing, which yields less materials needed to manufacture the device and it is therefore less expensive to produce.

Also, the present invention's method of determining direction by using a plurality of microphones allows for the possibility of determining distance from the portable device to the stationary device, which is a function the prior invention cannot perform. The method of how the plurality of microphones included on the portable device, determine the signal's distance is described in further sections.

SUMMARY OF INVENTION

The technology disclosed in this Provisional Patent Application is used to locate a stationary object's position in relation to where the user is located. For example, the described device can be attached to a user's key chain and used to locate an automobile. This application is not only limited to automobiles and can also be used for other motor vehicles such as motorcycles, snowmobiles, etc.

The Vehicle Location device is a two-part device, consisting of a stationary part and non-stationary part, which communicate with each other. The stationary part is housed on the vehicle, and the non-stationary part is a hand-held device that is carried by the user. The stationary part consists of a radio signal receiver and an ultrasonic speaker. When the receiver detects the corresponding signal from the hand held device, it activates the speaker to transmit a signal back to the hand held device. The hand held device is then able to interpret the stationary device's signal and locate the position of the stationary part of the device through that signal. The hand held device can then display the location of the device in terms of distance and direction to the user.

The hand held device is designed to attach to a key ring for the vehicle's keys. It is light in weight and can fit in the user's hand and pocket. The outside of the hand held device houses an activation button and a way to display the distance and direction to the vehicle from the user's relative position. One possible embodiment of the hand held device could be to house the activation button along the top right of the right-hand side wall, and use a liquid crystal display (LCD) screen to display the distance and direction of the vehicle. The liquid crystal display screen will be located on the bottom two-thirds of the front side of the device, allowing for the LCD to rest in the palm of the user's hand.

Internally, the hand held device houses four microphones, a transmitter, and a central processing unit. When the activation button is depressed, the hand held device emits an electromagnetic wave. When a microphone housed on the user's vehicle detects the signal, it activates an ultrasonic speaker that emits an acoustic pulse. The four microphones located on the hand held device then detect the acoustic pulse. The intensity of the signal detected by four microphones determines the direction of the vehicle and the intensity of the signal in one of those four that is designated for intensity measurements determines the intensity.

An alternative and simpler method and apparatus of the Vehicle Location device house only one microphone and an intensity indicator on the hand held device. In this embodiment the user would have to hold the device and point it in different directions, (a sort of manual scanning), and the direction that produces the highest intensity would indicate to the user the direction of the vehicle. The hand held device can display the intensity of the signal through a single light that illuminates or blinks when the microphone is pointed in the direction of the signal.

BRIEF DESCRIPTION OF THE DRAWINGS

FIG. 2 is an overall perspective of what the inventions embodiments could look like and how the different parts operate together.

FIG. 3 illustrates that the first two microphones that receive the ultrasonic signal determine the direction displayed to the user.

FIG. 4 further illustrates how direction of the incoming ultrasonic signal is determined and displayed to the user. More particularly, FIG. 4 illustrates the situation where microphones M2 and M3 are receiving the greatest signal intensity. There are three possibilities being illustrated in this figure: drawing A illustrates the case M2 is a receiving stronger signal than M3; drawing B illustrates the case M3 is receiving a stronger signal than M2; drawing C illustrates the case where one of the microphones has slightly stronger signal but not enough so it is assumed the abject is roughly the same distance from both microphones and the arrow points between the two microphones.

FIG. 5 represents the situation where the hand held device is quite far from the ultrasonic speaker by displaying few lit LED's.

FIG. 6 represents the situation where the handheld device is in close proximity of the ultrasonic speaker by displaying a greater number of lit LED's.

FIG. 7 illustrates the Block Scheme of the Direction Circuit.

FIG. 8 illustrates the hybrid circuit that receives intensities from four microphones as input signals, and as a result of receiving inputs, the circuit activates one of its four output leads. Each output lead indicates that a certain pair of microphones has the largest intensities, thus indicating the direction of the incoming acoustic pulse. The possible combinations of microphone pairs are represented as (M1 and M2), (M2 and M3), (M3 and M4) and (M1 and M4), which correspond to the four sides of the device.

FIG. 9 illustrates the Core Unit's algorithm of operation.

FIG. 10 illustrates the Block diagram of the Arrow Controller.

FIG. 11 represents the table of operation for the Arrow Controller unit.

FIG. 12 illustrates the analog part of the circuit that takes the alternate current (AC) signal from the input (microphone), and then amplifies and converts alternate current to direct current (DC), so the converted signal can be used as the input for the Core Unit and Arrow Pointer.

FIG. 13 illustrates the analog amplifier made using an Operational Amplifier, and an "ironing part" with a Full Bridge Rectifier, which has a big capacitor before the output.

FIG. 14 illustrates the Block Scheme of the Distance Indicator.

FIG. 15 illustrates the Table of Operation for the Level Detector unit.

DESCRIPTION AND OPERATION—MAIN EMBODIMENT

Figure 1:
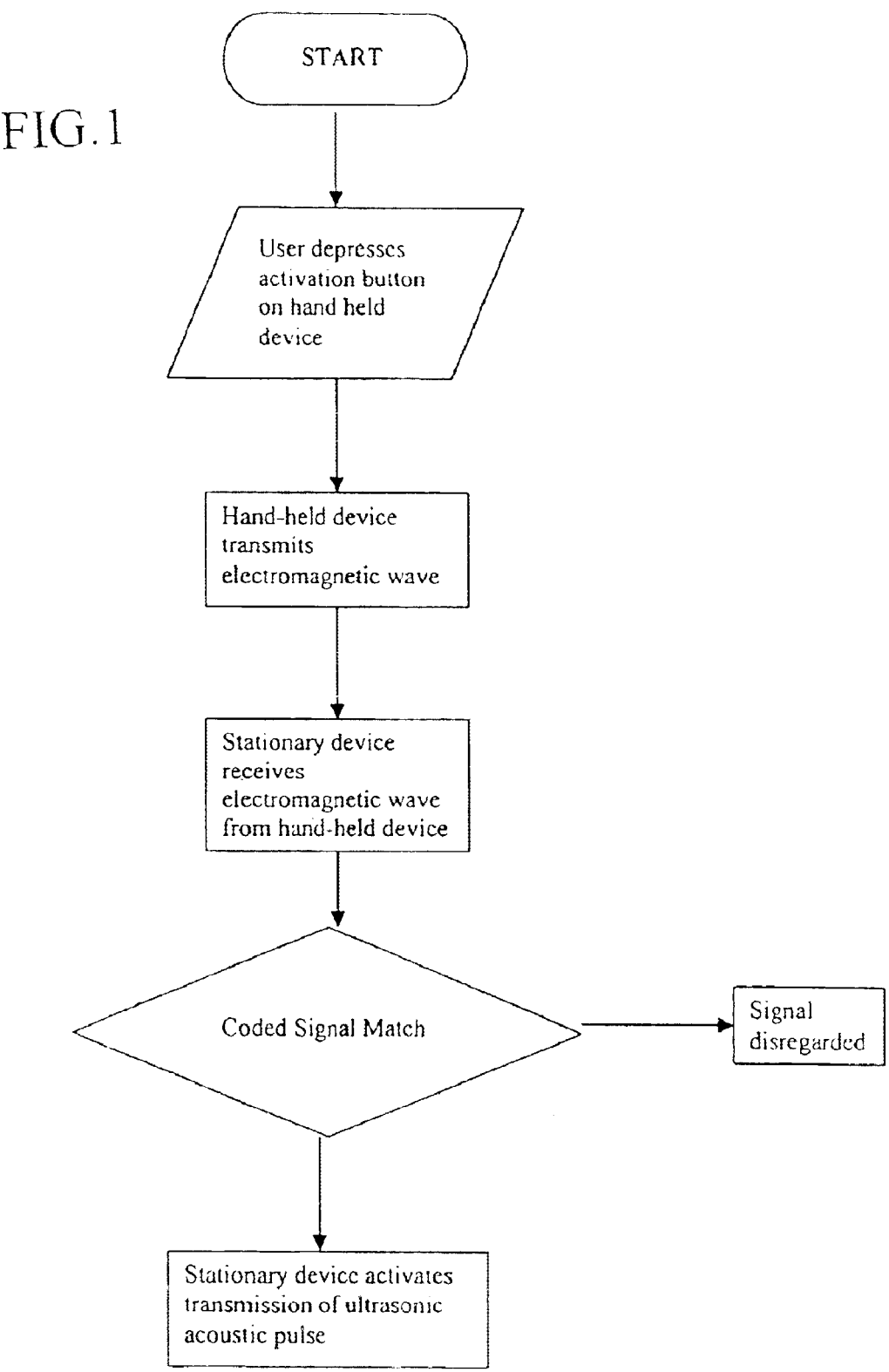
FIG. 1 is a flow chart describing the operation of the invention.

The car location device is an aid that is supposed to help people in finding their cars in big parking lots like the ones in front of malls or sport centers. It is easy to use, light and it can be carried in the pocket, or on a key chain. The user should just presses the button, and the arrow on the locator's display will point in the direction of the user's car. The principle of the device is shown in FIG. 2.

When the button is pressed, the device emits the coded electromagnetic signal, which activates the ultrasonic speaker mounted on the car. The ultrasound speaker then starts emitting the ultrasound, which is used by the device to determine where the arrow should point. At the same time an indicator (either LED's in a row or a LCD display with digits) should give the user an idea about the distance from the car.

The basic idea for the operation of the invention comes from the way humans determine the position of a sound source. Humans rely on the difference between the sound intensities to determine position. The ear, which is closer to the source, will sense a slightly higher intensity of sound. Using that information, the brain determines the position of the source.

The Vehicle Location device works in a similar manner to the human brain when determining the location of an incoming sound. The hand held device has a plurality of microphones located in the corners of the device. When the microphones receive the ultrasound signal, the device uses the signals from the microphones to direct the direction arrow towards the microphone(s) that detect the highest signal intensity. A visual example is provided in FIG. 3

Distance to the vehicle is also determined using the signals' sound intensity. The precision of the measurement is not great for several reasons. The ultrasonic speaker is most likely to be blocked by other cars, and the sound will not have direct path to the microphones. This implies that the device will detect the same signal intensity for different distances. That means that at some point if a better approximation of distance is acquired, the device would end up complex and spacious. That conflicts with the idea of a having light and portable device The Speaker Activation part of the device would use already known technologies; for example, the car ignition device and remote garage opener. Such devices already exist, and need no further explanations.

As mentioned above, operation of the device is based on the comparison of the intensities from the four microphones. In operation, the closest microphone will produce the electric signal of greatest intensity. One would think that the arrow should then point to the microphone with the greatest signal. However, that would give us only four directions for the arrow to point to, and it is not too accurate. The way to improve that is to consider four more situations. Those would naturally be for the arrow to point between the two microphones. That would give us eight directions for the arrow to point to.

Intuitively, that would mean that when the two microphones have the same intensity the arrow should point between them. Yet, this is a situation that will rarely occur. Also, there will be many situations when one of the microphones will have a slightly higher intensity, but the arrow needs to point in the middle. That leads to the conclusion that the two microphones with the highest signal intensity should be determined first. It is less likely that two microphones will detect the same signal intensity, than one microphone detecting a slightly higher intensity. Hence, signal intensities should be compared, and if the difference is greater than a specific value, the arrow should point to the higher intensity microphone; otherwise it should point between them. FIG. 4 helps to explain this operation.

When the two microphones with the greatest signals are determined, their signals should be compared, which is done by determining their difference. There are 3 possible situations for this example. Let $I_t$ be the threshold intensity difference, and $M_n$ the intensity detected by the microphone number n. Then, three situations are the following $M_2 > M_3$ and $M_2 - M_3 > I_t \rightarrow$ arrow points towards $M_2$
$M_2 < M_3$ and $M_3 - M_2 > I_t \rightarrow$ arrow points towards $M_3$
The final situation can have 2 sub-cases
$M_2 > M_3$ and $M_2 - M_3 < I_t \rightarrow$ arrow points between $M_2$ and $M_3$
$M_2 < M_3$ and $M_3 - M_2 < I_t \rightarrow$ arrow points between $M_2$ and $M_3$ This concept is further explained in the drawing section of the application under FIG. 8, which illustrates the hybrid circuit that receives intensities from four microphones as input signals, and as a result of receiving inputs, the circuit activates one of its four output leads. Each output lead indicates that a certain pair of microphones has the largest intensities, thus indicating the direction of the incoming acoustic pulse. The possible combinations of microphone pairs are represented as (M1 and M2), (M2 and M3), (M3 and M4) and (M1 and M4), which correspond to the four sides of the device.

There are basically two methods of implementing the distance indicator on the non-stationary device; the method using a liquid crystal display system and the method using a row of LED's. The first way is simply displaying the distance on the screen in numerals, for example 156 ft. The second method is explained below.

This method using LED's will require the use of at least one of four microphones, or an additional one that could be designated for measuring the distance. Part of the device should take the signal from the microphone as the input, and depending on the signal intensity, light up a certain number of LED's that correspond to the distance of the vehicle. See the example of the distance indicator on FIGS. 5 and 6.

FIG. 5 represents the situation where the device is quite far from the speaker (car), and picture 6 represents the situation where the device is close. Higher resolution, (number of LED's), gives better approximations about distance.

The Block Scheme of the Direction Circuit is illustrated by FIG. 7. The Direction Circuit is a hybrid circuit. The circuit gets signal intensities from 4 microphones as its input and gives digital output by activating one of its 8 output leads. Each output lead represents one direction the arrow should point.

The Core Unit is a hybrid circuit, pictured in FIG. 8, that gets intensities from 4 microphones as its input, and as a result it activates one of its 4 output leads each indicating that a certain pair of microphones has the largest intensities. Possible pairs are (M1 and M2), (M2 and M3), (M3 and M4) and (M1 and M4), which corresponds to the 4 sides of the device.

The Arrow Controller is a hybrid device similar to the previous device in FIG. 8. The Arrow Controller takes the two signals as its input, and it has an on/off lead with three output leads. One of the output leads is activated when the difference between the two signals is big enough for the arrow to point towards the microphone that received the greater signal intensity. A second output lead is activated when the other microphone receives a greater signal intensity. The third output lead is activated when the difference between signals is not sufficient for the arrow to point to either microphone, and that signal directs the arrow between the two microphones. FIG. 11 represents the table of operation for the Arrow Controller unit and will clarify the principles of its operation.

The Amplifier and Alternative Current/Direct Current (AC/DC) Converter is the analog part of the circuit that takes the alternate current (AC) signal from the input (microphone), and then amplifies and converts it to direct current (DC), so the converted signal can be used as the input for Core and Arrow Pointer units. It is shown on FIG. 12.

The Principles of Operation of Amplifier and AC/DC Converter unit consists of an analog amplifier made using operational amplifier, and the "ironing part" with full bridge rectifier, which has a big capacitor before the output. The basic scheme is shown in FIG. 12. When the signal comes from the microphone, it enters the amplifier and gets amplified. Then the signal moves into the full bridge rectifier and gets converted to DC. Finally, with the capacitor, it gets "ironed," or flattened, so the device will receive fairly straight voltage as the output.

The Block Scheme of the Distance Indicator unit is made of the Level Detector unit illustrated in FIG. 14, which takes the DC voltage as the input (fifth or one of the other four microphones), and based on signal intensity, activates a certain number of output lines, i.e. the stronger the signal, more output lines are activated. The input is considered the output from Amplifier and AC/DC converter. The input for this device would be taken from the output of one of (or $5^{th}$ one) AC/DC converters.

The more output lines that are activated, or higher resolution, the approximation of the distance is closer. If for example, there were only three output lines, resolution is 3, the device would be indicating "close" when all three output lines are activated. The distance locator would be indicating, "one third of the farthest detecting distance," away if two indicators are activated, and "passed one third of the distance" if only one indicator is activated. Obviously, if no indicators are active, the stationary device would indicate that the hand held device is "out of range".

FIG. 15 is the table of operation for the signal intensity level indicator. The table of this unit is presented when the unit resolution is "n" and the largest distance that the detector can detect is "D".

Total parts needed for the Arrow Part and Level Detector part, are: 18 operational amplifiers, 14 AND circuits, 6 OR circuits, 6 NO circuits, 4 NOR circuits, 16 diodes, 4 capacitors, and 8 potentiometers (trimmers). To all this, it should be added "n+1" operational amplifiers and "n" resistors, where "n" is the resolution of the Level Detector, and 1 amplifier is the one from the Amplifier and AC/DC converter before the Level Detector.

Description and Operation of Alternative Embodiments

An alternative practical application for our technology is an updated version of the game "Hide-and-Go-Seek". Each player of the game will be given a hand-held device, or wand, that emits electromagnetic waves and receives acoustic pulses similar to the car location device.

The players hiding will have devices that emit acoustic pulses, and the players that are seeking the hiding players will have devices that are able to emit electromagnetic waves and pick up the acoustic pulse signals from the hiding players. The player's devices will be easily carried by means of a backpack, leash, or some other form of attachment. Instead of containing a liquid display screen, the seeking device, can house a locating light(s) that will direct the seeking player in the direction of the hiding player.

The preferred application of this function is to arrange the locating lights to extend from a center light in eight directions, similar to a compass; north, north-east, east, south-east, south, south-west, west, and north-west. Each direction has three lights extending out from the center light that directs the seeker in the direction of the hider. The distance of the hider is determined by how many lights in that direction are lit. The closer the seeker is to the hider, the more lights in that direction will be lit. A hiding player will be able to determine when the seeking player is closing in on them through a detection light that increases in intensity as the seeker gets closer. When the seeking player is within 10 to 15 feet of the hider, their signal begins to scramble in all different directions. This will add fun to the game, because it gives the hider a chance to leave that location and gives the players a chase.

This technology can also be used in paintball games. Paintball games are simulated war games, in which combatants use air guns that shoot plastic pellets filled with colored paint that explode on impact, marking where the paint ball hit. Many of these paint ball games are played in large outdoor areas and with two teams that must find and shoot each other. Our technology can be used to assist in finding opposing players on the battle-field.

The Paintball game application can be used in several ways. One, it can be similar to the car location device and give the distance and direction of the opposing players through an arrow display and distance count on a liquid display screen. Two, the device can be set up similar to that of the hide and go seek game and define the direction and distance in the terms of lights, lit up in a particular direction, with the amount of lights lit describing the distance to the target.

To ensure that the hunting aspect of the game is not completely taken out of the game by the locating technology, the locating devices can be modified to act similarly to sonar. So when a player activates the player's locating device, it will alert opposing players of the seeking player and give the seeker's position away also.

Another alternative application of this technology is for the use of marking a particular path during such activities as hiking or cave spelunking. This application would require the user leave a series of stationary receivers along the users trail. These receivers can be equipped with an attaching device, such as a Velcro strap or clamp, the user can attach the receivers to landmarks. The user would use the handheld device to locate the closest receiver to their particular position. The user would then locate the individual receivers and follow the receivers in order to return along the same path the user originally took.

The locating device can also be used to identify the location of small children and pets. As with all the other uses of this technology, the child or pet must be fitted with a receiver module in order for the hand-held device to locate them. The receiver module can be attached to the pet or child using a Velcro or elastic strap that fits around their body. Parents or pet owners can then activate the locating signal through the hand-held device. The hand-held locating device can take either the liquid crystal display or light series form to identify position of the pet or child.

CONCLUSIONS, RAMIFICATIONS, AND SCOPE

Accordingly, the reader will see that the locating process used in the Vehicle Location invention can be used to easily and conveniently locate the user's vehicle in terms of distance and direction, can be easily carried by the user, and can be attached to the user's vehicle's keys via a key ring. In addition, this invention can embrace other applications to enhance its self worth to the user. Particularly, the Vehicle Location application can be used in conjunction with other devices, such as the remote door unlocking mechanism, remote engine ignition, the remote trunk opening mechanism, and amongst other remote devices, which are found on many present vehicles.

Furthermore, the Vehicle Location invention has the additional advantages in that;
  it can be applied as a game, where hiding players carry the stationary part of the device with them and the seeking player's carries the non-stationary part device with them, and the seeking player's use the device to locate the position, in terms of distance and direction, of the hiding player's;
  it is a way to enhance simulated combat games, where player's use the invention to locate the position, in terms of distance and direction, of opposing player's;
  it is a way to mark a user's particular path, while performing such activities as cave spelunking or hiking, by attaching a series of stationary devices along the user's path and locating them through the non-stationary device;

it is a way for the user to locate a pet or child by attaching a receiver/transmitter to the pet or child, and locating the pet or child using the hand-held device Although the description above contains many specificities, these should not be construed as limiting the scope of this invention but as merely providing illustrations of the presently preferred embodiments of this invention. For example, the hand held device part of the Vehicle Location invention, can house a series of lights instead of a liquid crystal display screen to point the user in the direction to the user's vehicle, or that the trail marking application can use either a Velcro strap or a clamp or something else to attach the stationary part of the device to a landmark, etc. Thus, the scope of this invention should not be determined by the specificities of the examples provided, but more by the concept of the invention's utility of locating a stationary position in relation to a relative position.

| U.S. Patent Documents | | | |
|---|---|---|---|
| 4,961,575 | Perry | October 1990 | 273/460 |
| 5,185,725 | Kent et al. | April 1992 | 180/167 |
| 5,204,657 | Prosser et al. | May 1991 | 340/571 |
| 5,606,325 | Masudaya | February 1997 | 342/357.08 |
| 5,686,887 | Chen | November 1997 | 340/539.19 |
| 5,921,199 | Gross | July 1999 | 116/28R |
| 6,126,303 | Gross | October 2000 | 362/544 |
| 6,203,181 | Gross | March 2001 | 340/486 |
| 6,246,314 | Djaid | June 2001 | 340/425.5 |
| 6,297,737 | Irvin | October 2001 | 340/571 |
| 6,298,803 | Gregg | October 2001 | 116/28R |
| 6,363,324 | Hildebrant | June 2000 | 701/213 |
| 6,344,797 | Hosny | February 2002 | 340/573.1 |
| 6,377,210 | Moore | February 2000 | 342/357.13 |
| 6,378,453 | Conway | March 2000 | 116/28R |
| 6,392,592 | Johnson et al. | May 2000 | 342/357.07 |
| 6,405,125 | Ayed | June 2002 | 701/200 |

-continued

| U.S. Patent Documents | | | |
|---|---|---|---|
| 6,407698 | Ayed | June 1999 | 342/357.07 |
| 6,489,921 | Wilkinson | December 2002 | 342/357.08 |
| 6,518,882 | Johnson | February 2003 | 340/539.1 |
| 6,535,125 | Trivett | August 2001 | 340/539.1 |
| 6,573,833 | Rosenthal | February 2002 | 340/539 |

What is claimed is:

1. A position locating device for identifying the distance and direction from a first object located with a user to a second object comprising;

a) a first electromagnetic signal transmitter for transmitting a first signal from the first object to the second object;

b) a second electromagnetic signal transmitter for transmitting a second signal from the second object to the first object;

c) a first receiver for enabling the first object to receive and decode the second signal from the second object;

d) a second receiver for enabling the second object to receive and decode the first signal from the first object;

e) activation means for activating the first transmitter;

f) activation means for activating the second transmitter and enabling it to respond to the signal transmitted from the first transmitter;

g) a plurality of microphones located at the first object for receiving and transmitting the second signal to the first receiver; and h) a processor for determining the location of the second object by analyzing the time at which each microphone received the second signal and the second signal's intensity.

* * * * *